UNITED STATES PATENT OFFICE.

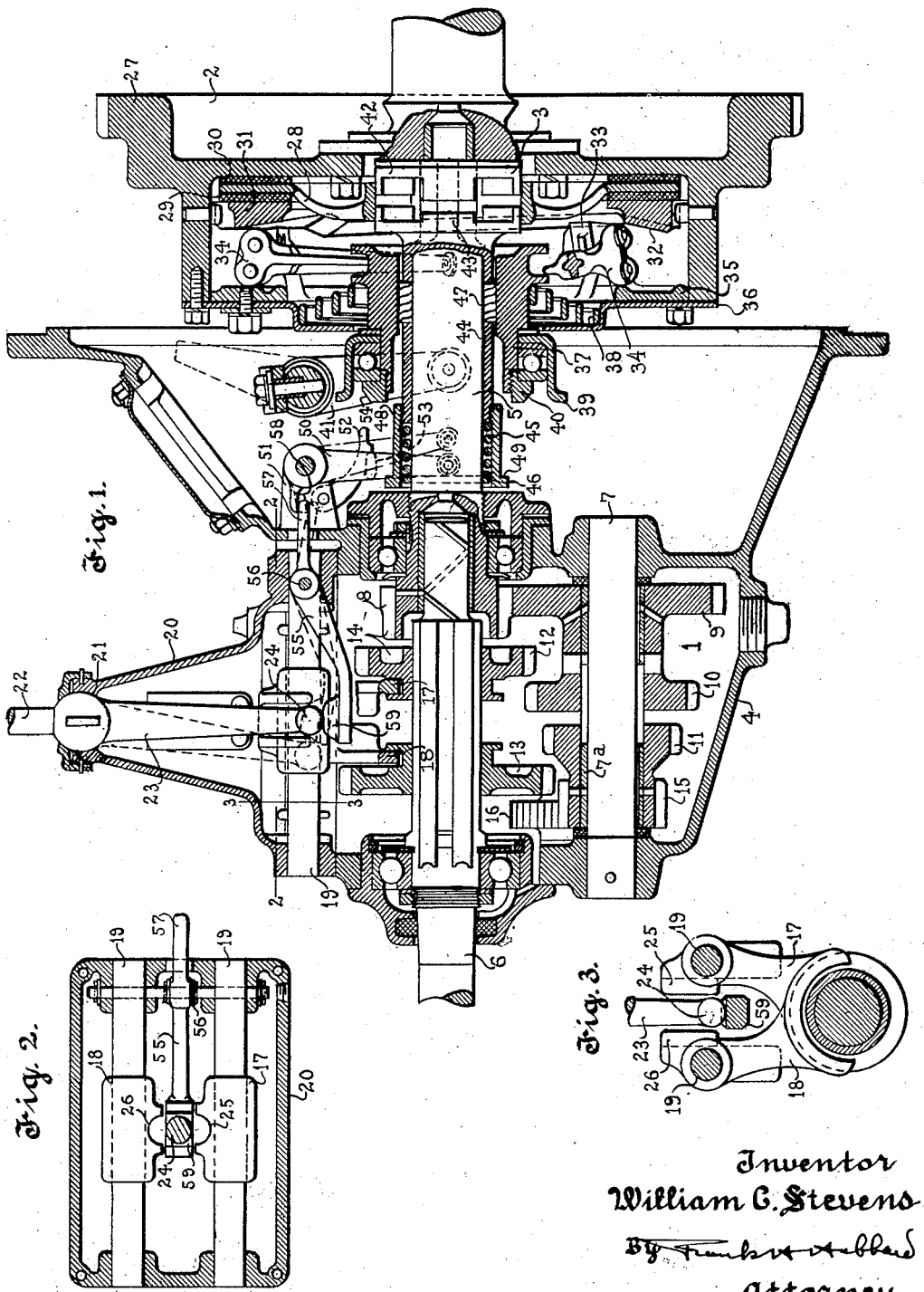

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

TRANSMISSION MECHANISM.

1,410,423. Specification of Letters Patent. Patented Mar. 21, 1922.

Application filed February 18, 1921. Serial No. 446,051.

*To all whom it may concern:*

Be it known that I, WILLIAM C. STEVENS, a citizen of the United States, residing at Milwaukee, in the county of Milwaukee and State of Wisconsin, have invented new and useful Improvements in Transmission Mechanisms, of which the following is a full, clear, concise, and exact description, reference being had to the accompanying drawing, forming a part of this specification.

This invention relates to transmission mechanisms and more particularly to variable speed transmissions for automobiles and the like.

My prior applications, Serial No. 420,934, filed November 1, 1920, and Serial No. 434,202 filed December 31, 1920, disclose several transmission mechanisms each including a friction clutch and a positive clutch, the latter being releasable upon release of the former to facilitate speed changing operations. The positive clutch is actuated by the operating mechanism of the friction clutch and the present invention has among its objects to provide for actuation of the positive clutch by the speed changing mechanism.

Another object is to provide a transmission mechanism having means for insuring release of the positive clutch upon neutralization of the change speed gearing and for effecting re-engagement thereof after initiation of the speed changing operation.

Another object is to provide a transmission mechanism of the aforesaid character wherein the clutches are so controlled as to enable shifting of gears either with or without disengaging the friction clutch while insuring against reestablishment of driving connections except by the friction clutch as is customary.

Various other objects and advantages of the invention will hereinafter appear.

The accompanying drawing illustrates an embodiment of the invention which will now be described, it being understood that the invention is susceptible of various modifications without departing from the scope of the appended claims.

In the drawing,

Fig. 1 is a sectional view of a transmission mechanism embodying the invention;

Fig. 2 is a sectional view on line 2—2 of Fig. 1; and

Fig. 3 is a fragmentary sectional view on line 3—3 of Fig. 1.

Referring to Fig. 1, the same shows a selective speed gear set 1 and driving means therefor including a friction clutch 2 and a releasable jaw clutch 3, the former driving through the latter.

The gear set 1 is of a conventional type providing for three speeds in a forward direction and one speed in a reverse direction, and the same includes a casing 4 carrying driving and driven shafts 5 and 6 and a countershaft 7. The driving shaft 5 has fixed thereto, a pinion 8 constantly meshing with a spur gear 9 fixed to a sleeve 7ª which is rotatable on countershaft 7 and said sleeve has fixed thereto gears 10 and 11 to be respectively and selectively meshed with gears 12 and 13 slidably keyed on driven shaft 6. The gears 10 and 12 and 11 and 13 provide for two different speed ratios of shafts 5 and 6, and the sliding gear 12 and pinion 8 have co-operating jaws constituting a coupling 14 by means of which the driving shaft 5 may be directly connected to driven shaft 6 to provide a third speed. Also the sleeve 7ª has a pinion 15 fixed thereto constantly meshing with a spur gear 16, the latter to be meshed by gear 13 on driven shaft 6 for reverse rotation of the latter. Gears 12 and 13 are movable in opposite directions from the neutral position shown in Fig. 1 by operating forks 17 and 18 respectively, said forks being slidably mounted on parallel shafts 19 carried by a housing 20 fixed to casing 4. Said housing has a bearing 21 in its upper end for receiving a gear shifting lever 22 and said lever has a downwardly extending arm 23 provided with a ball 24 on its lower end to be moved selectively into recesses 25 and 26 in operating forks 17 and 18 respectively. As is understood, the lower end of the gear shifting lever 22 is movable in an H path to selectively move the sliding gears 12 and 13 in opposite directions from their neutral position.

The friction clutch 2 and jaw clutch 3 are similar to those shown in my prior application 434,202 filed December 31, 1920, and as set forth in said application, the friction clutch 2 includes a driving member 27 and a driven member 28, the latter having friction rings 29 and 30 arranged on opposite sides thereof. The driven member 28 is adapted to be frictionally connected to the driving member 27 by an axially movable thrust collar 31 having thrust seats 32 to be engaged by thrust blocks 33 mounted on operating levers 34. Operating levers 34 are pivoted to a supporting ring 35 carried by an end plate 36 secured to driving member 27 and said levers are arranged to be actuated by a retractor collar 37 which is biased towards the right by a spring 38 to effect setting of the friction clutch. Retractor collar 37 has a throwout cup 39 secured to the left end thereof by a nut 40 and a pivoted operating fork 41 is provided by moving said cup towards the left for release of the friction clutch.

Jaw clutch 3 comprises co-operating jaw members 42 and 43, the former being fixed to drive shaft 5 and the latter being rotatable on said shaft and being slidably keyed to driven member 28 of the friction clutch. Jaw member 43 is provided with a sleeve extension 44 extending through a bore in retractor collar 37 and the same is biased towards the right for engagement with its co-operating member 42 by a spring 45 located between the left end thereof and a collar 46 fixed to driving shaft 5. Sleeve extension 44 is slotted to receive rollers 47 for maintaining retractor collar 37 in centered relation with respect to driving shaft 5 and the same has secured thereto a sleeve 48 having a shoulder 49 to be engaged by an operating fork 50. Fork 50 is pivoted to a lug 51 in casing 4 and the same is movable from the position indicated in dotted lines to a position indicated in full lines to release jaw member 43 from its co-operating member 42 against the action of spring 45. Lug 51 also carries a latch 52 arranged to engage a lug 53 on operating member 50 to lock the latter in its releasing position and said latch is adapted to be tripped by an inclined face 54 on nut 40 upon movement of retractor collar 37 into its released position.

Operating lever 50 is actuated by a lever 55 arranged between shafts 19 and pivoted at 56 to the housing 20. Lever 55 is provided with a projecting arm 57 arranged to engage the under side of an arm 58 on operating fork 50 and the same is also provided with a cam portion 59 for engaging the under side of ball 24 on gear shifting lever 22. Operating lever 55 is so proportioned that when the gear shifting lever 22 is in neutral position lever 55 assumes a position wherein the jaw member 43 is released from its co-operating jaw member 42. Upon movement of the gear shift lever into any of its operative positions, lever 55 is movable to the position shown in dotted lines to permit full engagement of jaw member 43 with jaw member 42. The faces of cam 59 are so formed that jaw member 43 engages jaw member 42 only following meshing of the gears during shifting operations.

From the foregoing it is apparent that the jaw clutch 3 provides for releasing the driven friction member 28 from the drive shaft 5 upon neutralization and during initial meshing of the gears, thereby greatly facilitating gear shifting operations. Furthermore it should be noted that the latch 52 insures against movement of the jaw member 43 into engagement with jaw member 42 unless the friction clutch is first disengaged thereby insuring against re-establishment of driving connections except by the friction clutch as is customary. On the other hand the jaw clutch being disengageable by the shifting lever and being restrained by the latch 52 the gears may be easily and safely neutralized and shifted either before or after disengagement of the friction clutch.

While the invention has been shown and described in connection with a certain type of gear set and friction clutch, it is apparent that the same is not limited thereto. Also it should be noted that the jaw clutch can be arranged in other parts of the transmission mechanism as shown in my prior application, Serial No. 420,934 and that the same can be actuated by other types of gear shifting devices.

I claim—

1. In a variable speed transmission mechanism, in combination, change speed gearing, operating means therefor, a releasable friction clutch for transmitting power to said gearing and a driving connection between said friction clutch and certain of the parts of said gearing to be released by said operating means upon neutralization of said gearing.

2. In a variable speed transmission mechanism, in combination, change speed gearing, driving connections for said gearing including a friction clutch and a positive clutch the former driving through the latter and operating means for said latter clutch insuring release thereof upon neutralization of said gearing and providing for re-engagement thereof after initiation of speed changing operations.

3. In a variable speed transmission mechanism, in combination, change speed gearing, driving connections for said gearing including a friction clutch and a positive clutch, the former driving through the latter and operating means for said latter clutch insuring release thereof upon neutralization of said gearing, and providing for re-engagement thereof after initiation of speed changing operations, but only when said friction clutch is released.

4. In a variable speed transmission mechanism, in combination, a selective speed gear set, a gear shifting element therefor, driving connections for said gear set including a friction clutch and a positive clutch the former driving through the latter and operating means controlled by said gear shifting element for releasing said positive clutch upon neutralization of said gear set and providing for re-engagement thereof after initiation of speed changing operations.

5. In a variable speed transmission mechanism, in combination, a selective speed gear set, a gear shifting element therefor, having a neutral position and a plurality of operative positions driving connections for said gear set including a friction clutch and a positive clutch the former driving through the latter and operating means for said positive clutch associated with said gear shifting element and adapted to release said positive clutch during movement of said element into neutral position and to free said positive clutch therefrom upon movement of said element into any of its operative positions.

6. In a variable speed transmission mechanism, in combination, a selective speed gear set, a gear shifting element therefor, driving connections for said gear set including a friction clutch and a positive clutch, the former driving through the latter, means associated with said gear shifting element for disengaging said positive clutch upon neutralization of said gearing and for relieving said positive clutch of restraint by said element upon subsequent operation of the latter, said means including means under the control of said friction clutch for restraining said positive clutch.

7. In a variable speed transmission mechanism, in combination, a selective speed gear set, gear shifting and neutralizing means therefor, a friction clutch and a positive clutch for transmitting power to said gear set, the former driving through the latter, means associated with said shifting and neutralizing means for releasing said positive clutch upon neutralization of said gearing and permitting re-engagement thereof during shifting operations, a spring opposing release of said positive clutch, and means for restraining said positive clutch in its released position pending release of said friction clutch to trip the last-mentioned means.

8. In a variable speed transmission mechanism, in combination, a selective speed gear set, a gear shifting element therefor, having a neutral position and a plurality of speed changing positions a friction clutch and a jaw clutch for transmitting power to said gearing, the former driving through the latter, cam operating means associated with said gear shifting element to release said jaw clutch during movement of said shifting element into neutral position and to permit re-engagement thereof during final movement of said element into any of its speed changing positions.

9. In a variable speed transmission mechanism, in combination, change speed gearing, a friction clutch and a jaw clutch for transmitting power thereto, the former driving through the latter and common operating means for neutralizing said gearing and for releasing said jaw clutch during neutralizing operations.

10. In a variable speed transmission mechanism, in combination, a selective speed gear set, shifting and neutralizing means therefor, a friction clutch and positive clutch for transmitting power to said gear set the former driving through the latter, an operating member for said positive clutch movable in one direction upon neutralization of said gearing to release said positive clutch and in an opposite direction upon shifting said gearing to permit re-engagement thereof, a latch for restraining said positive clutch in its released position, said latch being releasable by said friction clutch upon release thereof, and a spring for effecting engagement of said positive clutch upon tripping of said latch.

In witness whereof, I have hereunto subscribed my name.

WILLIAM C. STEVENS.